United States Patent
Challoner et al.

(10) Patent No.: US 6,859,725 B2
(45) Date of Patent: Feb. 22, 2005

(54) LOW POWER POSITION LOCATOR

(75) Inventors: A. Dorian Challoner, Manhattan Beach, CA (US); Dean V. Wiberg, LaCrescenta, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/370,750

(22) Filed: Feb. 20, 2003

(65) Prior Publication Data

US 2003/0236619 A1 Dec. 25, 2003

Related U.S. Application Data

(60) Provisional application No. 60/391,315, filed on Jun. 25, 2002.

(51) Int. Cl.[7] .............................................. G01C 21/00
(52) U.S. Cl. ........................ 701/207; 701/213; 701/220
(58) Field of Search ................................ 701/213, 214, 701/207, 220; 342/357.08, 351, 357.06, 357.09, 357.14; 340/572.1

(56) References Cited

U.S. PATENT DOCUMENTS 6,512,478 B1 * 1/2003 Chien .................... 342/357.09

* cited by examiner

Primary Examiner—Yonel Beaulieu
(74) Attorney, Agent, or Firm—Patent Venture Group

(57) ABSTRACT

A device for determining a user positioning including an RF position locating device (e.g., a GPS receiver) for intermittently determining a reference position and an inertial sensing system for determining a position change from the reference position. A current position is determined from the reference position and the position change and the inertial sensing system operates at a lower power level than the RF position locating device.

18 Claims, 3 Drawing Sheets

LOW POWER POSITION LOCATOR

CROSS-REFERENCE TO RELATED APPLICATIONS

This application claims the benefit of the following co-pending and commonly-assigned U.S. provisional patent application, which is incorporated by reference herein:

U.S. patent application Ser. No. 60/391,315, filed Jun. 25, 2002, and entitled "LOW POWER POSITION LOCATOR".

BACKGROUND OF THE INVENTION

1. Field of the Invention

The present invention relates to devices and methods for determining position information, particularly for low power handheld devices.

2. Description of the Related Art

Locating the position of hand held devices such as cellular phones, personal digital assistants (PDAs) and wristwatches is becoming increasingly desirable for a number of reasons related to individual safety (e.g., locating the origin of 911 emergency calls), location based information services, personal navigation, etc. Position location based on the global positioning system (GPS) is becoming affordable because of the integration of most functions on a single chip. However, because of the great distance of the GPS satellites (over 20,000 km distant) the signal is extremely weak and requires great complexity, power and time to reliably detect, especially indoors or in cluttered urban environments with multipath signals. In addition, portable energy storage technology to support the higher power requirements of such systems, e.g. lithium batteries, is advancing very slowly. Hence, the practicality of continuous and/or autonomous position awareness remains poor.

System combining GPS and inertial sensors have been developed for navigational systems such as used on aircraft. However, the objective for such systems has been to improve or refine the accuracy of the GPS measurement. In general, these systems are large and expensive. In addition, the GPS operations for such systems operate continuously. Such systems have not been developed for small handheld devices to reduce power overall consumption.

There is a need for inexpensive devices and methods for determining position information of a user. There is also a need for such devices and methods for use in small handheld devices. Further, there is particularly a need for such devices and methods which operate at low power consumption levels. The present invention meets these needs.

SUMMARY OF THE INVENTION

A low power, high performance, continuous position location device is disclosed. In general, the invention comprises a low power microinertial navigation system with power, $P_i$, that provides nearly continuous location, and orientation information and a radio frequency (RF) position locating device (e.g., a GPS receiver) with power, $P_r$, that is turned on only intermittently with duty cycle, $E_r$, to update the location and inertial sensor bias estimates. Thus, the total power required for the device can be much lower than those required for the RF position locating device operating alone.

A typical embodiment of the invention comprises a radio frequency (RF) position locating device for intermittently determining an initial position (such as a GPS receiver) and an inertial sensing system for determining a position change from the initial position. A current position of the device is determined from the initial position and the position change and the inertial sensing system operates at a lower power level than the RF position locating device.

Various MEMS inertial sensors suitable for application in embodiments of the present invention have been developed in recent years. For example, U.S. patent application Ser. No. 09/928,279, filed Aug. 10, 2001, and entitled "ISOLATED RESONATOR GYROSCOPE", by A. Dorian Challoner and U.S. patent application Ser. No. 10/370,953 filed Feb. 20, 2003, and entitled "ISOLATED RESONATOR GYROSCOPE WITH A DRIVE AND SENSE PLATE", by A. Dorian Challoner and Kiril V. Shcheglov; present MEMS sensors suitable for use in embodiments of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1A:
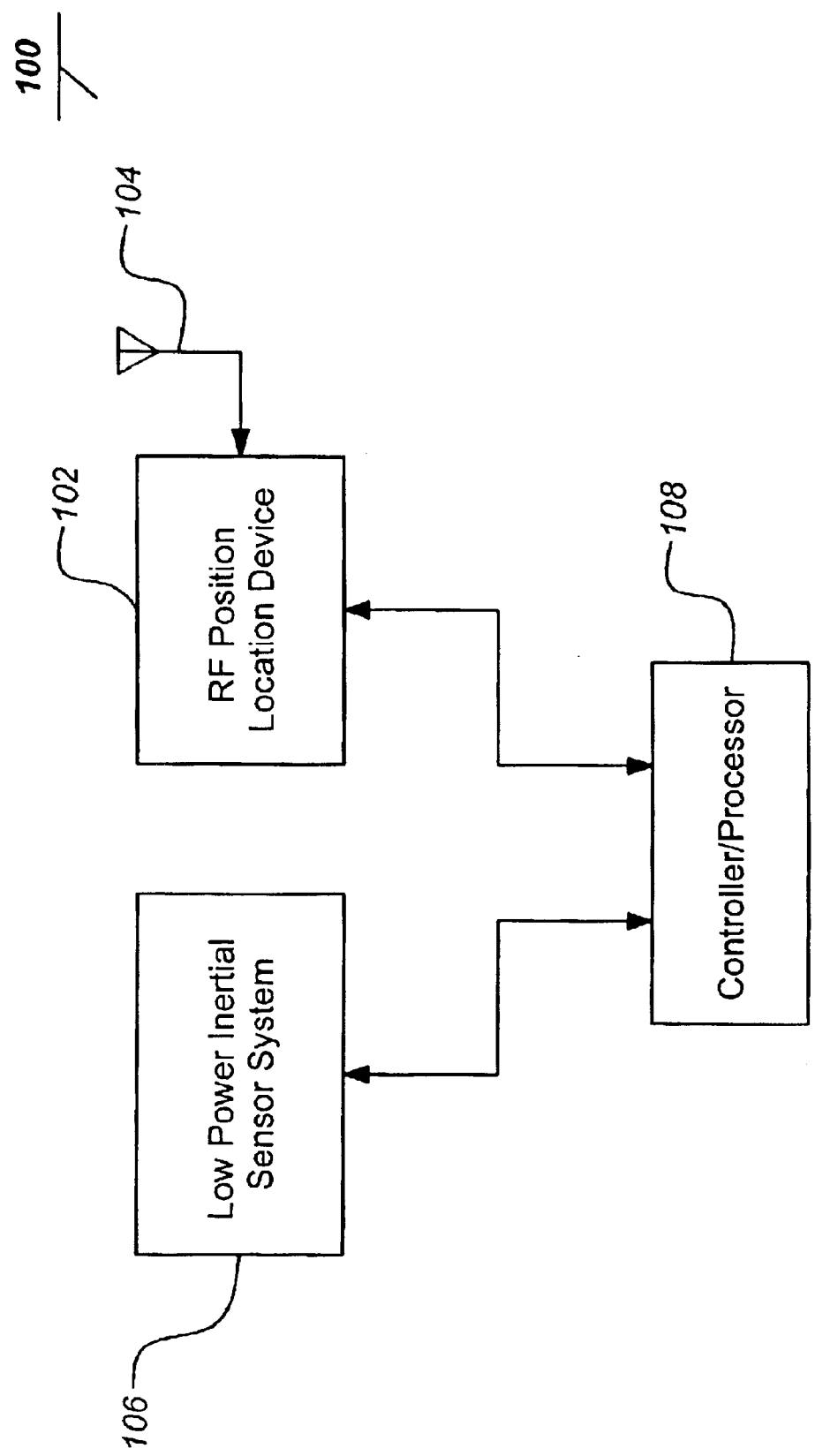
FIG. 1A is a functional block diagram of an exemplary embodiment of the invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

The high detection energy and required robustness of operating an accurate RF positioning tool (such as GPS receivers) in challenging electromagnetic (EM) environments drives a significant power requirement for such devices. Embodiments of the present invention can greatly reduce the required power through very low duty-cycle operation of the RF position device in conjunction with an on-board inertial navigation system based on very low-power electrostatic microinertial sensors and very high quality mechanical resonators. With typical resonator electrostatic gaps of less than 10 microns and Q values greater than 10,000 encapsulated in a Faraday cage package, the relative detection complexity for microinertial versus GPS sensors is highly advantageous. This translates into very low operating power, $P_i$, for inertial navigation compared to the significantly higher power, $P_r$, required for robust RF navigation, e.g., GPS-based systems.

2. Power Efficiency

A typical embodiment of the invention encompasses a low power, high performance, position location device comprising a low power microinertial navigation system with power, $P_i$, that provides practical continuous location determination and orientation information. An RF position locating device, (e.g., a GPS receiver), with power, $P_r$, that is turned on only intermittently, with duty cycle, $E_r$, to update the location and inertial sensor bias estimates. Thus, the total power of position determining device of the invention being:

$$P_o = P_i + E_r \times P_r \qquad (1)$$

To realize an advantage the power, $P_o$, of the operating combination device should be less than the power, $P_r$, required for a system using an RF position locating device alone. Applying this to equation (1), the necessary relationship between the power of the inertial navigation system and the RF position locating device can be presented:

$$P_i < P_r \times (1-E_r) \qquad (2)$$

Thus, the power of the inertial navigation system should be lower than the power of RF position location device multiplied by the inverse of its duty cycle. For most practical applications, $P_i \ll P_r$. Thus, the combination device yields a substantially similar accuracy and robustness for significantly less required power.

For example, an exemplary microgyro control ASIC has been designed using approximately two milliwatts per gyro axis and an estimated ten milliwatts in an inertial measurement unit (IMU) application. The operating IMU can hold GPS precision for a estimated minimum of five minutes. The microinertial navigation system includes three microgyros and three microaccelerometers and strap-down inertial navigation calculation. The microinertial navigation system can be operated under a closed loop output control, such as described in U.S. Pat. No. 6,360,601, issued Mar. 26, 2002 and entitled "MICROGYROSCOPE WITH CLOSED LOOP OUTPUT", by Challoner et al., which is hereby incorporated by reference herein. In contrast, a GPS chip with two correlators consumes approximately sixty-four milliwatts.

In addition, search time of the RF position location device can be reduced in the combination device by applying an apriori estimate of the inertial navigational system to the RF position location operation. For adequate indoor GPS operation of an RF position location, as many as 16,000 correlators have been proposed. With an apriori inertial estimate, the acquisition search time and RF detection duty cycle, $E_r$, and/or detection energy, can be even further reduced. This can obviate or reduce the need for GPS-A information processing through a 700 mw code division multiple access (CDMA) or time division multiple access (TDMA) wireless phone chip. An energy savings of ninety percent or more with continuous, high performance position location information is thus achievable with the present invention. Further, RF detection performance can also be enhanced with apriori inertial-based position information or higher, intermittent power to improve RF detector signal to noise performance.

3. Exemplary Device Embodiment

A microinertial/RF navigator embodiment of the present invention can hold location precision, e.g. meeting e911 (emergency location of 911 calls) requirements of cellular phone autonomous location accuracy of 50 meter for an estimated five minutes in between very brief GPS updates, so that continuous power consumption, $P_o$, of approximately 10 mw can be achieved.

FIG. 1A is a functional block diagram of an exemplary embodiment of the invention. The low power position locator 100 includes an RF position location device 102, such as a GPS receiver, and a low power inertial sensor system 106. The RF position location device 102 intermittently determines an initial position of the user using signals received through an antenna 104. The low power inertial sensor system 106 continuously determines position change. Intermittent operation of the RF position location device 102, i.e. low duty cycle, minimizes overall power consumption of the locator 100 because the inertial sensing system 106 operates at a significantly lower power level than the RF position locating device 102. The current position is determined from the combination of the most recent reference position from the RF position location device 102 and the current position change determined by the inertial sensing system 106.

Typically, the RF position locating device 102 comprises a global positioning system (GPS) receiver for intermittently determining the reference position. As is known in the art, using timing codes received from Earth satellites such systems can interpolate a relatively precise position. The power required to operate the receiver and processing for such systems is not insubstantial. Further, these power requirements become more severe when the signal to the receiver is inhibited. e.g. when the receiver is located indoors. It is important to note, however, that the present invention is not limited to operate with a GPS receiver; the invention can be applied to any system where the basic position location device requires a power level substantially greater than that of the inertial sensing system 106 (as discussed in the previous section).

Intermittent operation of the RF position locating device 102 can be effected in different ways. Perhaps the simplest is for the RF position locating device 102 to determine the reference position at substantially regular time intervals. However, an alternate method may trigger a reference position determination by the RF position locating device 102 only if the position change determined by the inertial sensing system 106 exceeds a specified limit. Using this second method, the duty cycle of the RF position locating device 102 becomes variable; if the user remains relatively stationary (as determined by the continuous inertial sensor) the device may experience very long periods without making a new reference position determination. In addition, a hybrid method can be used where a minimum and/or maximum time limit between reference determinations is applied while a position change limit is also applied.

A controller/processor 108 manages operation of the inertial sensor system 106 and the intermittent operation RF position location device 102. The controller/processor 108 also combines the initial position information from the RF position location device 102 and the position change information from inertial sensor system 106 to determine a current position of the user. Also, processing and control functions for the integrated low power position locator 100 (including the control system for the inertial sensor system 106 and/or processing for the RF position location device 102) can be shared among the individual functional devices or combined in one or more processing devices.

Figure 1B:
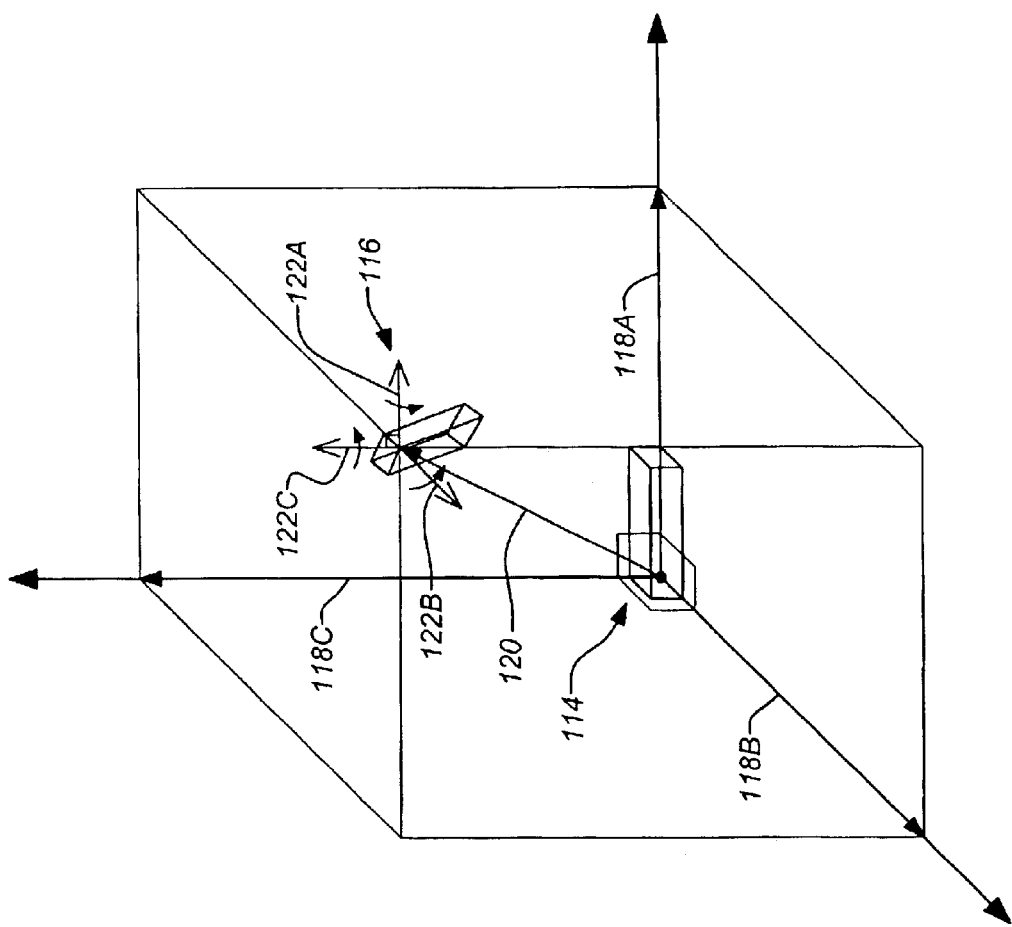
FIG. 1B is a diagram showing accelerometer and gyro sensing to determine a position change for the inertial sensing system.

FIG. 1B is a diagram showing accelerometer and gyro sensing to determine a position change from the inertial sensing system. The reference position provided by the RF position location device 102 is shown as the origin 114. The position change 116 is determined from the low power inertial sensor system 106. The position change 116 can include either or both a translation and a rotation. Thus, the low power inertial sensor system 106 can be a complete inertial measurement unit (IMU) including both translation and rotation sensing for three mutually orthogonal axes. Translation sensing can be provided by three accelerometers that each provide an acceleration measurement that is double integrated to produce a translation distance 118A–118C. The combination of the translation distances 118A–118C is the translation vector 120. Rotation sensing can be provided by three microgyros, each determining a rotation rate measurement about each axis. Each rotation rate is integrated to produce a rotation 122A–122C about each axis which can be combined into a single orientation change. The translation vector and the combined orientation change together represent the position change 116 for the device 100.

Integration of the inertial sensor system 106 can also benefit the operation of the RF position location device 102 in further embodiments of the invention. An apriori estimate from the inertial sensing system 106 can be applied to the RF position location device 102 when determining the reference position. As a result, the search time of the RF position location device 102 is shortened, thereby reducing the necessary duty cycle. The controller/processor 108 can coordinate the integrated operation of inertial sensor system 106 and the RF position location device 102 in applying the apriori estimate.

4. Exemplary Method Embodiment

Figure 2:
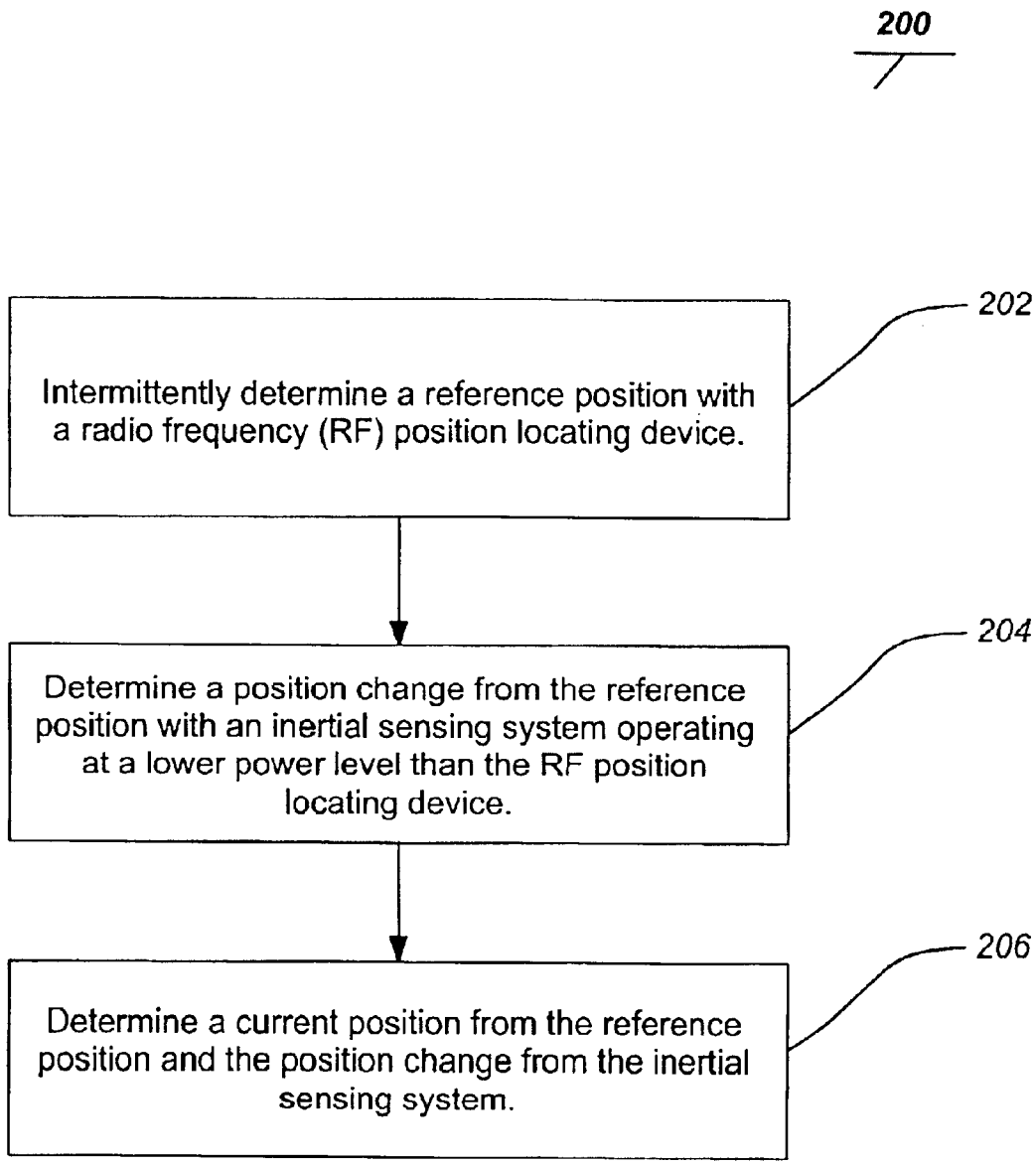
FIG. 2 is a flowchart of a typical method implementing the present invention.

FIG. 2 is a flowchart of a typical method 200 implementing the present invention. At block 202, a reference position is intermittently determined with a radio frequency (RF) position locating device. At block 204, a position change from the reference position is determined with an inertial sensing system operating at a lower power level than the RF position locating device. Finally, at block 206 a current position is determined from the reference position and the position change from the inertial sensing system.

As discussed above, in further embodiments of the invention an apriori estimate from the inertial navigation device can be applied to the RF position location device to reduce the acquisition search time, RF detection duty cycle, $E_r$, and/or the detection energy. A ten fold or greater energy savings for continuous, high performance position location information is thus achievable with this invention. RF detection performance can also be enhanced with a priori inertial-based position information.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and examples provide a complete description of the manufacture and use of the invention. Since many embodiments of the invention can be made without departing from the scope of the invention, the invention resides in the claims hereinafter appended.

What is claimed is:

1. A device comprising:
   a radio frequency (RF) position locating receiver, for intermittently determining a reference position, and having a power $P_r$ that is turned on only intermittently with a duty cycle $E_r$; and
   an inertial sensing system, for determining a position change relative to the reference position, such that a current position is determined from the reference position and the position change, and having a power $P_i$ that is continuous;
   wherein a total power $P_o=P_i+E_r \times P_r$ required for the device is lower than the power $P_r$ for the RF position locating receiver.

2. The device of claim 1, wherein the reference position is determined using an apriori estimate from the inertial sensing system.

3. The device of claim 1, wherein the RF position locating receiver comprises a global positioning system (GPS) receiver for intermittently determining the reference position.

4. The device of claim 1, wherein the power $P_i$ of the inertial sensing system is less than the power $P_r$ of the RF position locating receiver multiplied by an inverse of the duty cycle $E_r$ of the RF position locating receiver.

5. The device of claim 1, wherein RF position locating receiver is used to determine the reference position only if the position change determined by the inertial sensing system exceeds a specified limit.

6. The device of claim 1, wherein RF position locating receiver is used to determine the reference position at substantially regular time intervals.

7. The device of claim 1, wherein the inertial sensing system includes at least one microelectromechanical system (MEMS) sensor.

8. The device of claim 7, wherein the inertial sensing system includes three MEMS accelerometers for determining a translation vector and three MEMS gyros for determining an orientation change wherein the position change comprises a combination of the translation vector and the orientation change.

9. The device of claim 7, wherein the inertial sensing system includes three MEMS sensors each sensing a measurement for one of three mutually orthogonal axes.

10. A method comprising the steps of:
    intermittently determining a reference position with a radio frequency (RF) position locating receiver, wherein the RF position locating receiver has a power $P_r$ that is turned on only intermittently with a duty cycle $E_r$; and
    determining a position change relative to the reference position with an inertial sensing system, such that a current position is determined from the reference position and the position change, wherein the inertial sensing system has a power $P_i$ that is continuous;
    wherein a total power $P_o=P_i E_r \times P_r$ required for the device is lower than the power $P_r$ for the RF position locating receiver.

11. The method of claim 10, wherein the reference position is determined using an apriori estimate from the inertial sensing system.

12. The method of claim 10, wherein the RF position locating receiver comprises a global positioning system (GPS) receiver for intermittently determining the reference position.

13. The method of claim 10, wherein the power $P_i$ of the inertial sensing system is less than the power $P_r$ of the RF position locating receiver multiplied by an inverse of the duty cycle $E_r$ of the RF position locating receiver.

14. The method of claim 10, wherein RF position locating receiver is used to determine the reference position only if the position change determined by the inertial sensing system exceeds a specified limit.

15. The method of claim 10, wherein RF position locating receiver is used to determine the reference position at substantially regular time intervals.

16. The method of claim 10, wherein the inertial sensing system includes at least one microelectromechanical system (MEMS) sensor.

17. The method of claim 16, wherein the inertial sensing system includes three MEMS accelerometers for determining a translation distance and three MEMS gyros for determining an orientation change wherein the position change comprises a combination of the translation distance and the orientation change.

18. The method of claim 16, wherein the inertial sensing system includes three MEMS sensors each sensing a measurement for one of three mutually orthogonal axes.

* * * * *